(12) United States Patent
Pelfrey et al.

(10) Patent No.: US 9,719,469 B1
(45) Date of Patent: Aug. 1, 2017

(54) TURBO-PISTON ENGINE

(71) Applicants: Riley Dale Pelfrey, Clear Water, FL (US); Rick Dean Pelfrey, Bellbrook, OH (US); Jordan Matthew Gartenhaus, Rockville, MD (US)

(72) Inventors: Riley Dale Pelfrey, Clear Water, FL (US); Rick Dean Pelfrey, Bellbrook, OH (US); Jordan Matthew Gartenhaus, Rockville, MD (US)

( * ) Notice: Subject to any disclaimer, the term of this patent is extended or adjusted under 35 U.S.C. 154(b) by 0 days.

(21) Appl. No.: 15/151,605

(22) Filed: May 11, 2016

(51) Int. Cl.
| | |
|---|---|
| *F02B 37/18* | (2006.01) |
| *F02B 37/16* | (2006.01) |
| *F02B 37/00* | (2006.01) |
| *F02B 33/40* | (2006.01) |
| *F02B 33/44* | (2006.01) |
| *F02B 27/04* | (2006.01) |
| *F02M 35/10* | (2006.01) |
| *F02M 35/104* | (2006.01) |
| *F01N 13/10* | (2010.01) |
| *F02B 75/02* | (2006.01) |

(52) U.S. Cl.
CPC ....... *F02M 35/10157* (2013.01); *F01N 13/10* (2013.01); *F02B 27/04* (2013.01); *F02B 33/40* (2013.01); *F02B 33/44* (2013.01); *F02B 37/00* (2013.01); *F02B 37/16* (2013.01); *F02B 37/18* (2013.01); *F02B 37/183* (2013.01); *F02B 75/02* (2013.01); *F02M 35/104* (2013.01); *F02M 35/10118* (2013.01); *F02B 2700/021* (2013.01)

(58) Field of Classification Search
CPC ........ F02B 37/18; F02B 37/183; F02B 37/16; F02B 37/00; F02B 33/40; F02B 33/44; F02B 2700/021; F02B 27/04
USPC ...... 123/559.1, 68; 60/602, 605.1, 605, 280, 60/314, 315
See application file for complete search history.

(56) References Cited

U.S. PATENT DOCUMENTS

| | | | | |
|---|---|---|---|---|
| 1,644,719 A | * | 10/1927 | Fliedner | ................. F01M 13/02 123/41.66 |
| 2,198,679 A | * | 4/1940 | Radelet | ..................... F02B 1/00 123/198 R |

FOREIGN PATENT DOCUMENTS

GB           2320521 A    *    6/1998          F01L 1/28

* cited by examiner

*Primary Examiner* — Mark Laurenzi
*Assistant Examiner* — Wesley Harris
(74) *Attorney, Agent, or Firm* — R. William Graham

(57) ABSTRACT

The present invention uses the exhaust gas of an internal combustion reciprocating engine to drive a turbine. The turbine is position around the cylinder. The turbine is connected to systems that will use the energy to improve the total system efficiency. One such system would be connected to a compressor to create the force induction required for two-stroke engines.

8 Claims, 11 Drawing Sheets

TURBO-PISTON ENGINE

FIELD OF INVENTION

This invention relates to internal combustion engines and more specifically to two stroke force induction using an integrated turbocharger.

BACKGROUND OF INVENTION

This technology is shown with a two-stroke reciprocating engines, but not limiting to this type of internal combustion engine. Two-stroke engine have high power to weight ratio compared to four-stroke reciprocating engines. Two contributing factors are the two-stroke engine has few components and a power cycle per revolution. Two stroke engines require a force induction to operate. The force induction is commonly done through the crankcase using the piston to force the air to the cylinder through a transfer port. Force induction has also been done with superchargers and turbochargers which increase the package size of the engine. There is a demand to increase the power density and reduce the power to weight and volume ratio.

SUMMARY OF INVENTION

An objective of the invention is to build a cleaner two stroke engine and to provide a compact force induction system that uses waste exhaust gases.

Another objective is to improve the engines fuel efficiency.

Still another object is to improve emissions, particularly in two stroke engines.

An embodiment of the invention is directed to a turbocharged, uni-flow, two-stroke engine. The engine includes an engine housing having a cylinder within the housing having an intake in a first end of said cylinder, at least one exhaust port in a second end of said cylinder, a fuel injector operably connected to the intake, an intake poppet valve operably connected to the first end of the cylinder to open during intake of air and fuel and close post intake, a piston operably reciprocally disposed in the cylinder having a piston head and piston shaft, the piston head moving between a compression ignition position to prevent air and fuel from exiting through the exhaust port wherein air and fuel are trapped within the cylinder and an exhaust position to permit spent emissions to exit the exhaust port; a drive shaft operably connected to the piston shaft, and a combination turbine and compressor wheel concentrically operably disposed about the cylinder to receive exhaust from the at least one exhaust port causing rotation thereof and intake of air through at least one channel within an intake manifold of the housing into the intake.

In a preferred embodiment, there are plurality of exhaust ports equidistantly spatially positioned about a 360° circumference of the cylinder. The combination turbine and compressor wheel includes a first plurality of blades to receive spent exhaust via the at least one exhaust port and a second plurality of blades axially disposed from the first plurality to draw fresh air into the intake. There is at least one arcuate channel in the housing which forms a path which air is forced through by the combination turbine and compressor wheel to deliver to the intake.

The housing includes a manifold about the combination turbine and compressor wheel wherein the first plurality of blades form a turbine portion disposed in an exhaust manifold portion immediately following the at least one exhaust port and the second plurality of blades form a compressor portion disposed inside an intake manifold portion. The exhaust ports are configured at an angle to the first plurality of blades to optimally direct flow there against and maximize compression.

During operation when the exhaust port is unshrouded by the piston, the exhaust flows past the turbine, which converts internal energy from the gas into rotational motion for the turbocharger wheel. With the exhaust ports placed along the entire 360° circumference of the cylinder, this will put as much turbine blade surface area in contact with the exhaust gas as possible. The exhaust ports are oriented to optimally direct flow into the turbine blades.

As the turbine extracts energy from the exhaust stream, the resultant mechanical rotation allows the compressor to increase and pressure and mass in the intake manifold. The intake manifold narrows at the point of the compressor wheel as minimize clearance at the ends of the compressor blades. The outlet of the compressor leads to a small plenum just above the intake poppet valve, whose volume should equal no less than the trapped volume of the piston and cylinder assembly. The embodiment shown in this design has the turbine blade and compressor blades attached to a common turbocharger wheel. The design could include multiple rows of blades for either turbine or compressor and could be made from multiple components.

The intake port features air-flow guide vanes tangent to the cylinder circumference to help create a strong swirling effect as the intake charge enters the combustion chamber. The exhaust port(s) at the bottom of the cylinder are also directed tangent to the cylinder circumference, but are meant to encourage flow rotation in the opposite direction of the intake fluid rotation.

DETAILED DESCRIPTION OF PREFERRED EMBODIMENT

The following detail description with appended drawings sets forth the invention which is generally referred to by the numeral 100. The numerals where are identical represent like elements of the embodiments. Terms such as top, bottom, horizontally and vertically describes an orientation relative to the drawings only and do not necessarily correspond to an actual engine plane in which these parts may be incorporated.

Figure 1:
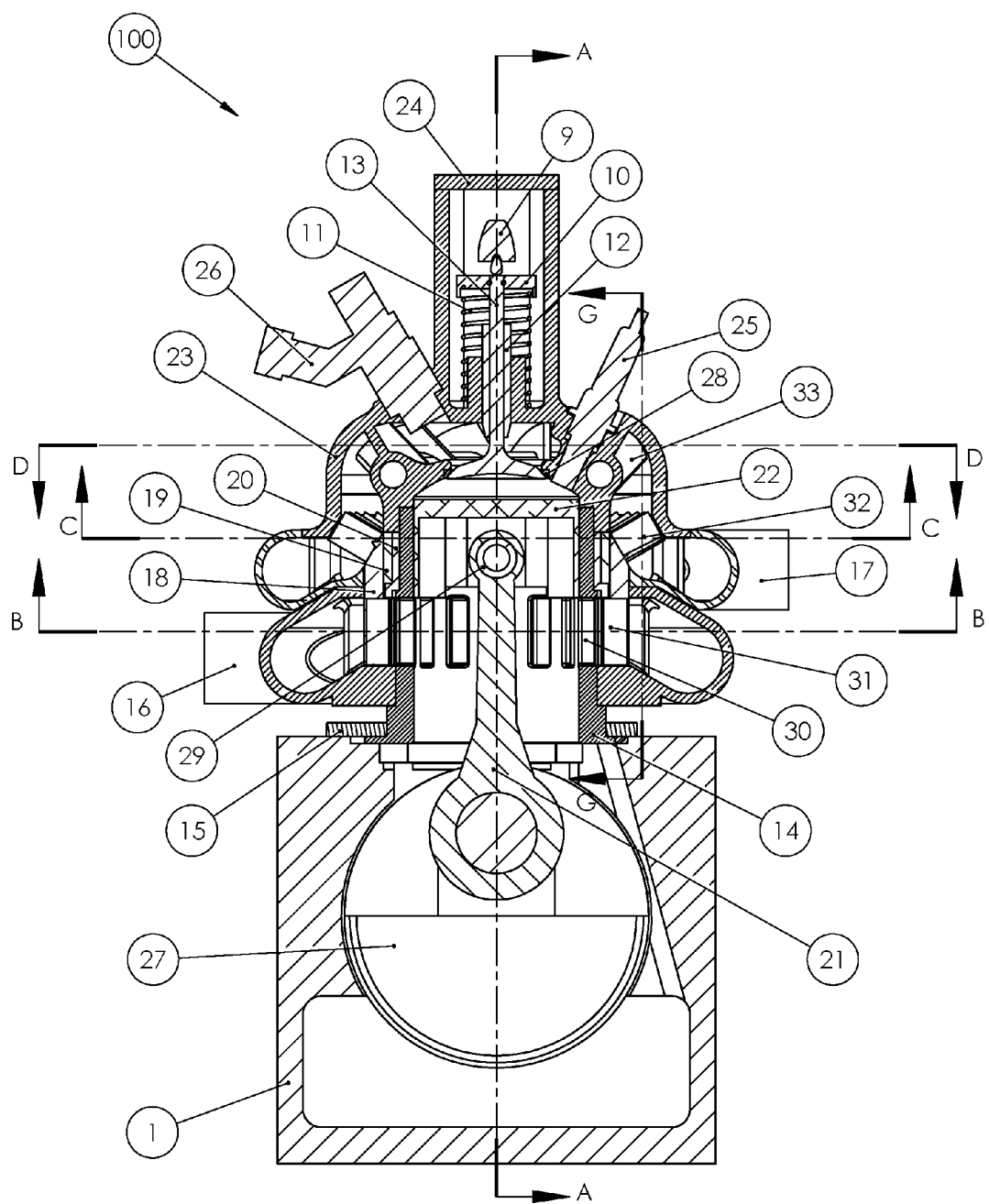
FIG. 1 is a sectional view of a prototypical internal combustion engine reciprocating assembly, crankcase, fuel injector, spark plug, and poppet valve.
Figure 2:
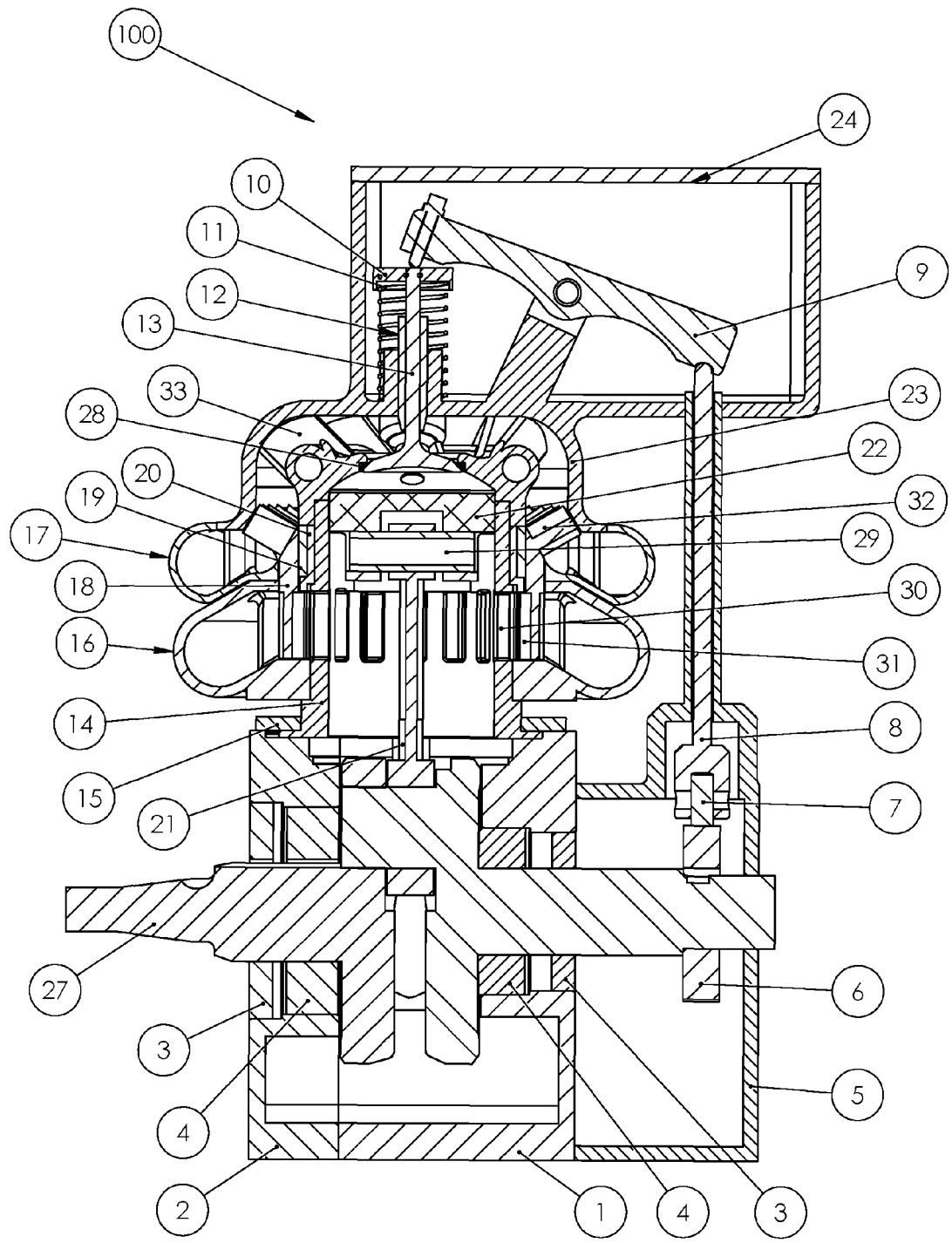
FIG. 2 is the sectional view along line A-A in FIG. 1 including cam, rocker arm and pushrod.
Figure 3:
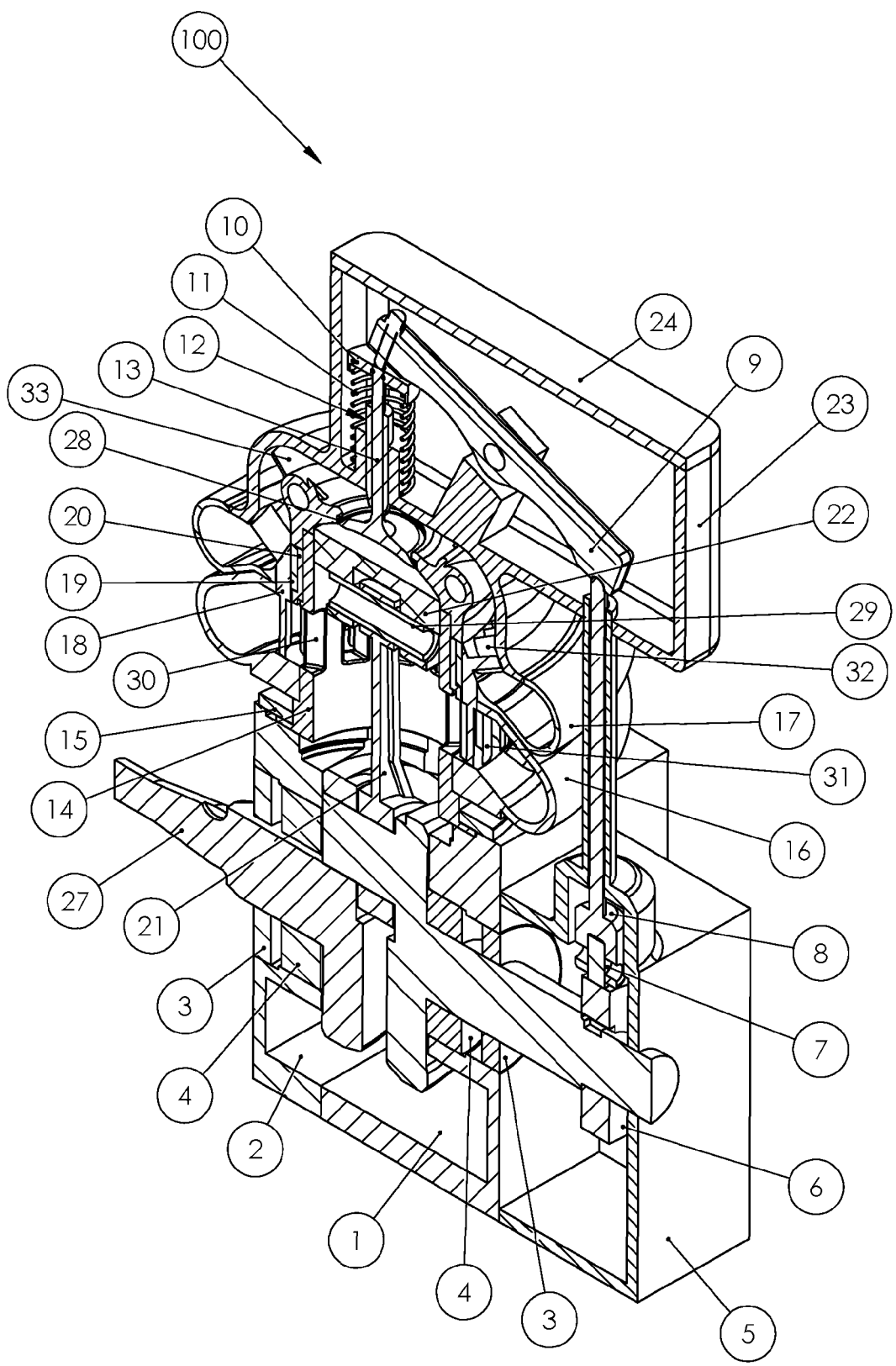
FIG. 3 is an isometric view of FIG. 2.
Figure 5:
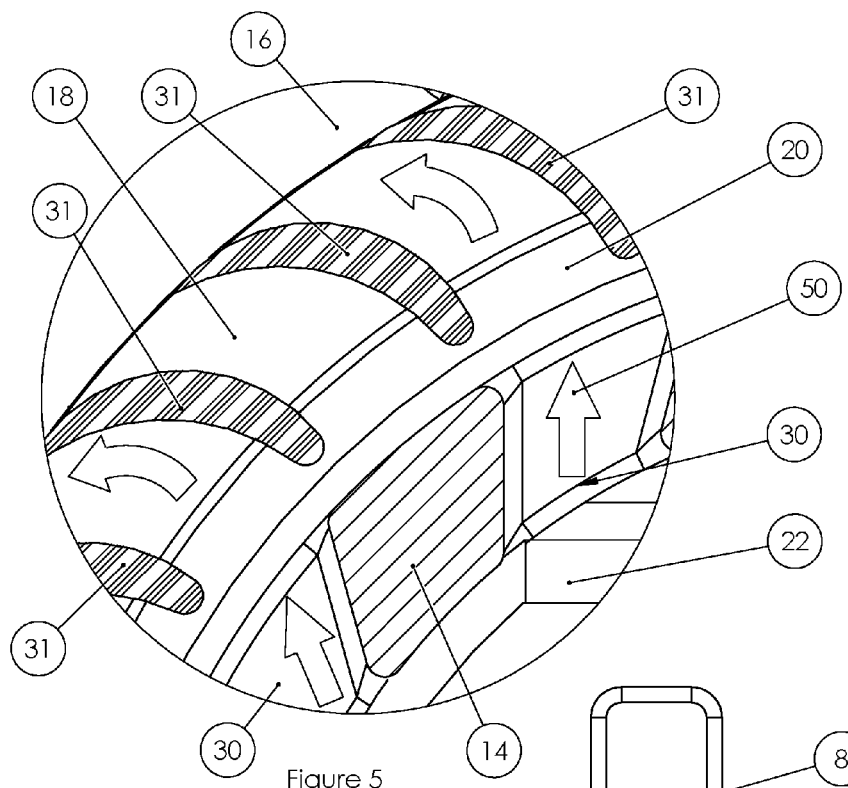
FIG. 5 is a detail expanded view of a portion "E" in FIG. 4.
Figure 4:
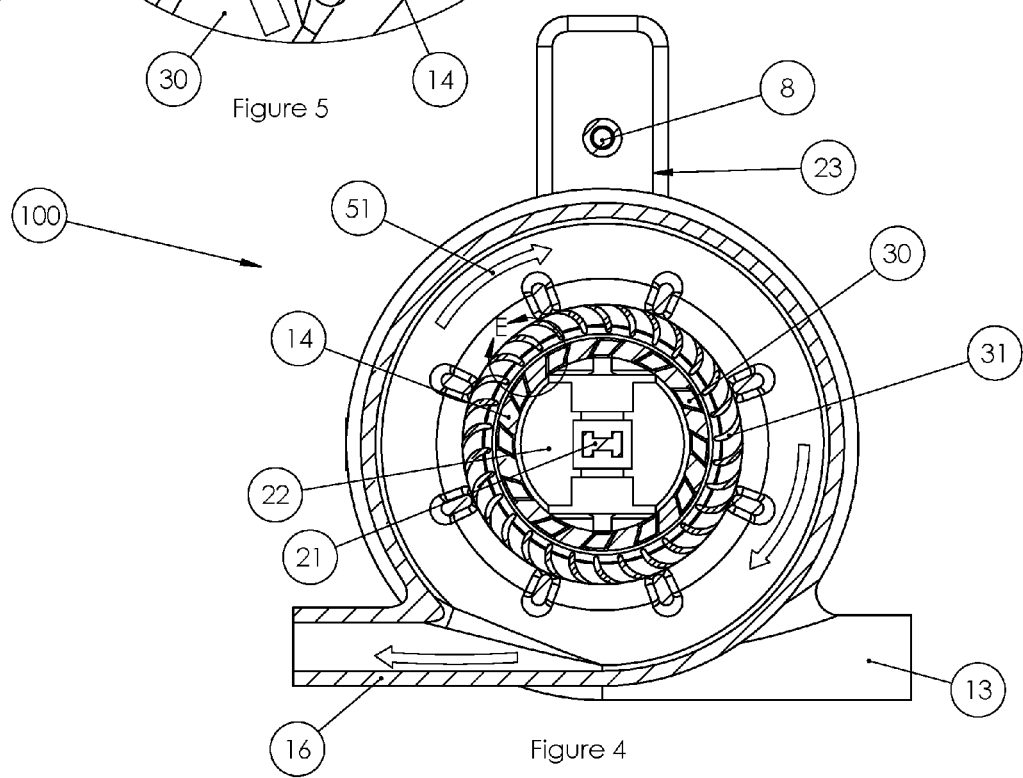
FIG. 4 is a sectional view along line B-B in FIG. 1 of the exhaust manifold, turbine blades and exhaust port(s) as viewed from the bottom of the engine.

As shown in FIG. 1, FIG. 2, and FIG. 3, the main body of the engine include a large crankcase section 1 and a small crankcase section 2, a cylinder sleeve 14 attached to an upper part of the crankcase sections 1 and 2 by way of an associated retainer 15, and a cylinder head 23 disposed over an upper part of the cylinder sleeve 14.

The crankcase sections 1 and 2 are two halves forming a crankcase which are fastened together, by bolts for example, with each half rotatably supporting a crankshaft 27 via bearings 4. Seal 3 is present about the crankshaft 27. One end of the crankshaft 27 is operably connected to a cam 6, which is used to actuate a poppet valve 13 which is operably disposed within the cylinder head 23 an rides along a valve guide surface 12 within the cylinder head 23. The poppet valve 13 includes a head 23 which seats against a valve seat 28 while in a closed position. The poppet valve 13 is held in the closed position against the valve seat 28 by a return spring 11 and its retainer 10 which is formed in a valve cover 24 which is connected to cylinder head 23.

Motion is transferred to the poppet valve 13 via a camshaft roller 7 operably connected to a pushrod 8 which in turn is operably connected to a rocker arm 9 pivotally mounted above cylinder head 23 within the valve cover 24 which converts motion such that the poppet valve 13 is pushed into and along a centerline of the cylinder sleeve 14. The cam 6 and pushrod roller 7 are both enclosed by the cam cover 5. The rocker arm 9, poppet valve 13, spring 11 and retainer 10 assembly are enclosed by the valve cover 24.

A reciprocating assembly consists of a connecting rod 21 and piston 22. The connecting rod 21 is connected to and rotates upon a crankshaft pin 34. The piston 22 is connected to the connecting rod 21 using a piston wrist pin 29, and the piston 22 reciprocates within the cylinder sleeve 14 as a function of the movement of rod 21.

Intake and exhaust gas exchange process is a function of position of piston 22 and poppet valve 13. Fresh air entering the cylinder sleeve 14 is controlled by the cam 6 disposed on end of crankshaft 27 which in turn indirectly drives poppet valve 13. A fuel injector 26 is operably disposed in the cylinder head 23 to inject fuel into incoming air charge past the poppet valve 13 as it opens and is displaced from valve seat 28 and as exhaust port(s) 30 formed in a lower part of cylinder sleeve 14 is closing. Fuel and air mixture in the cylinder sleeve 14 is ignited by a spark plug 25 which is operably disposed, e.g., threaded, into the top of the cylinder head 23.

Combustion byproducts are removed from the cylinder sleeve 14 via fixed exhaust port(s) 30 in the cylinder sleeve 14. The exhaust ports 30 are normally obstructed by the piston 22, and are only unshrouded when the piston 22 nears bottom of the cylinder sleeve 14, which effectively represents an end of a power cycle.

Air is pumped through the engine 100 by means of a turbocharger wheel 18 concentric to the cylinder sleeve 14, and rotates upon a bearing 19 and bearing retainer 20. The exhaust turbine blades 31 are located in an exhaust manifold 16 and connects to the turbocharger wheel 18 having a plurality of intake compressor blades 32 located in an intake manifold 17.

As shown in FIG. 4, FIG. 5, FIG. 11 and FIG. 12, energy to rotate the compressor blades 32 is extracted from high pressure exhaust flow 50 as the gas flows past the turbine blades 31. The exhaust port(s) 30 are oriented such that the exhaust flow 50 is directed at an optimum angle relative to the exhaust turbine blades 31 as to extract a maximum possible energy from the hot expanding gases. Exhaust flow 50 is then directed away from the turbine blades 31 through the exhaust manifold 16 and is subsequently vented to the atmosphere.

Figure 7:
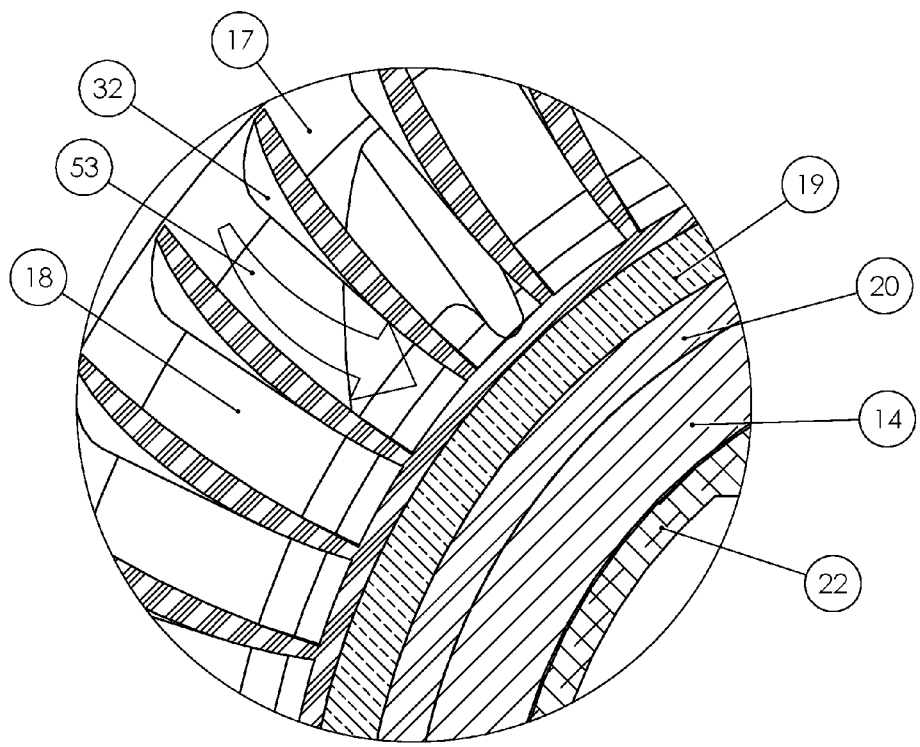
FIG. 7 is a detail expanded view of a portion "F" in FIG. 6.
Figure 6:
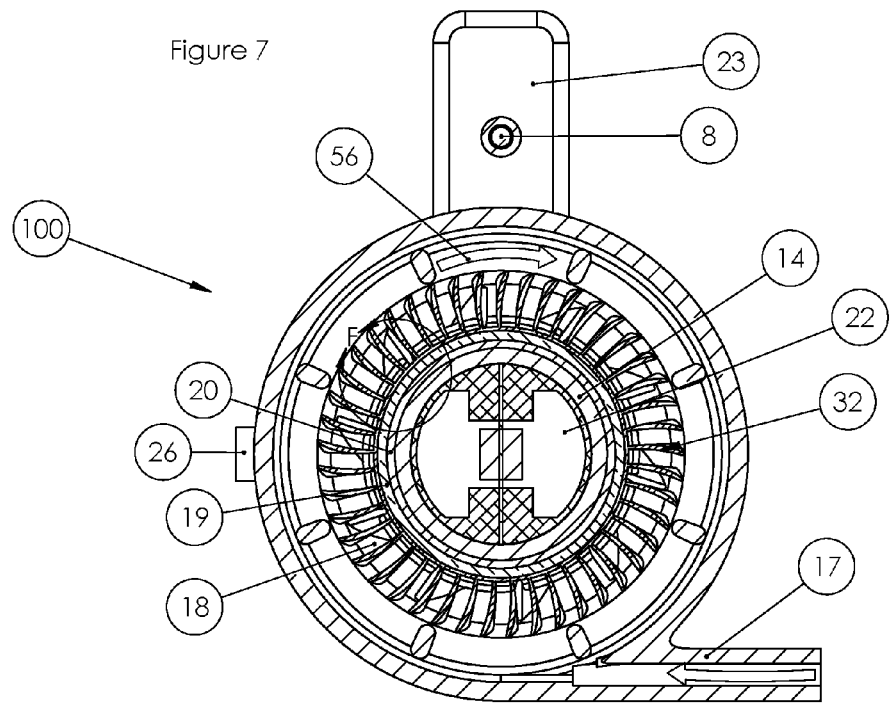
FIG. 6 is a sectional view along line C-C in FIG. 1 of the intake manifold and compressor blades as viewed from the bottom of the engine.

As shown in FIG. 6 and FIG. 7, the energy extracted by the turbine blade 31 from the high pressure exhaust 50 is used by the compressor blade 32 to pump air into the intake manifold 17. As rotational velocity of the turbocharger wheel 18 increases, the volume in the intake manifold 17 preceding the compressor blades 32 drops below absolute atmospheric pressure, and the volume following the compressor blades 32 increases beyond absolute atmospheric pressure. Hence, the region constituting the volume before the compressor blades 32 is termed the "intake low pressure" side 56 and the region constituting the volume after the compressor blades 32 is termed the "intake high pressure charge" side 53.

Figure 9:
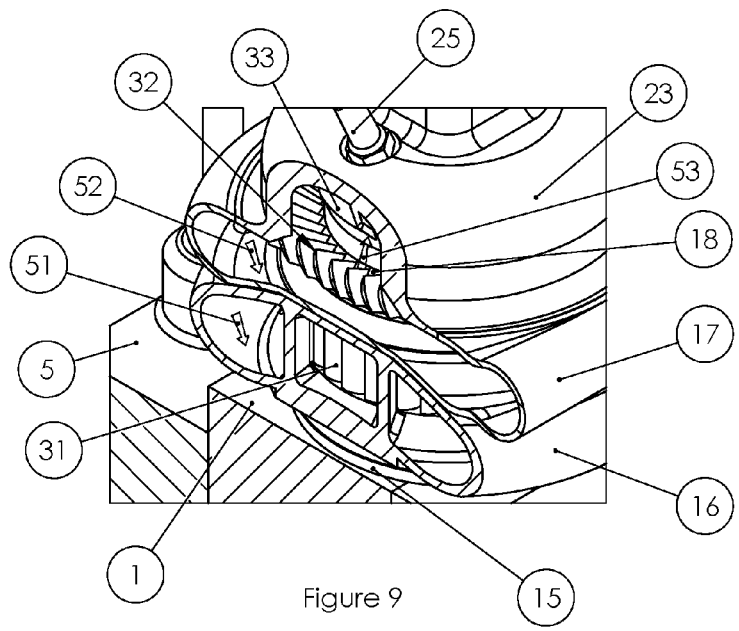
FIG. 9 is a sectional view along line G-G in FIG. 1 of one end of the intake and exhaust manifolds.
Figure 8:
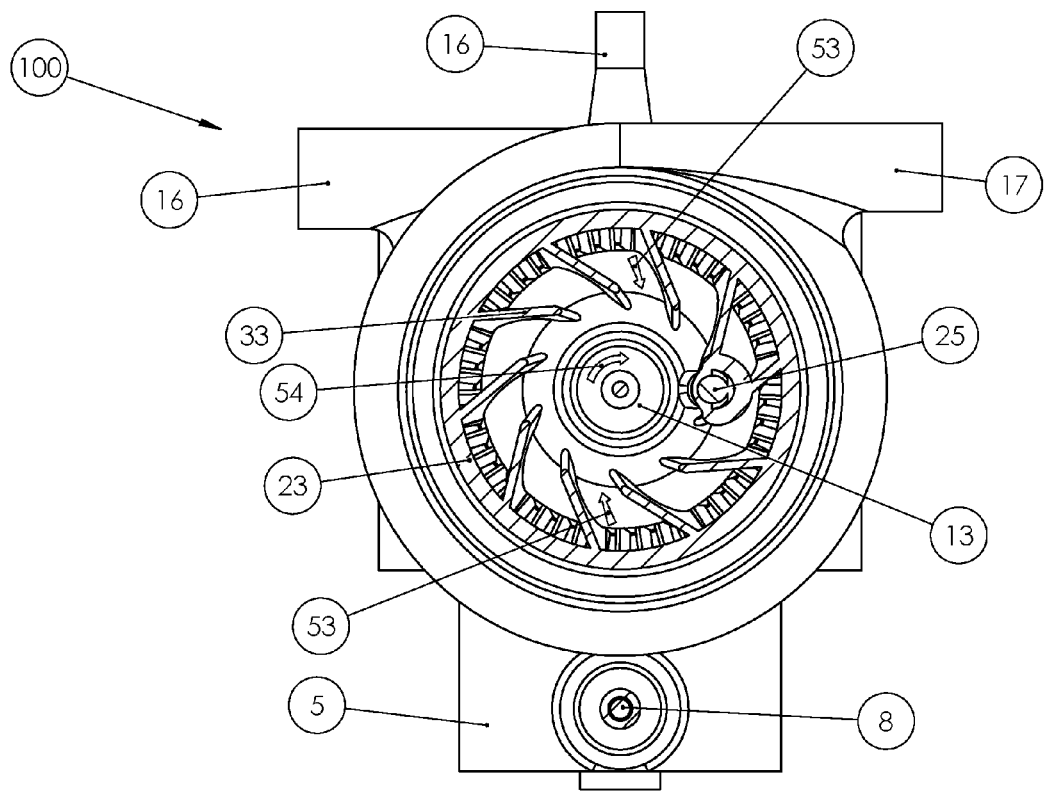
FIG. 8 is a sectional view along line D-D in FIG. 1 of the intake manifold and intake directional vanes as viewed from the top of the engine.
Figure 12:
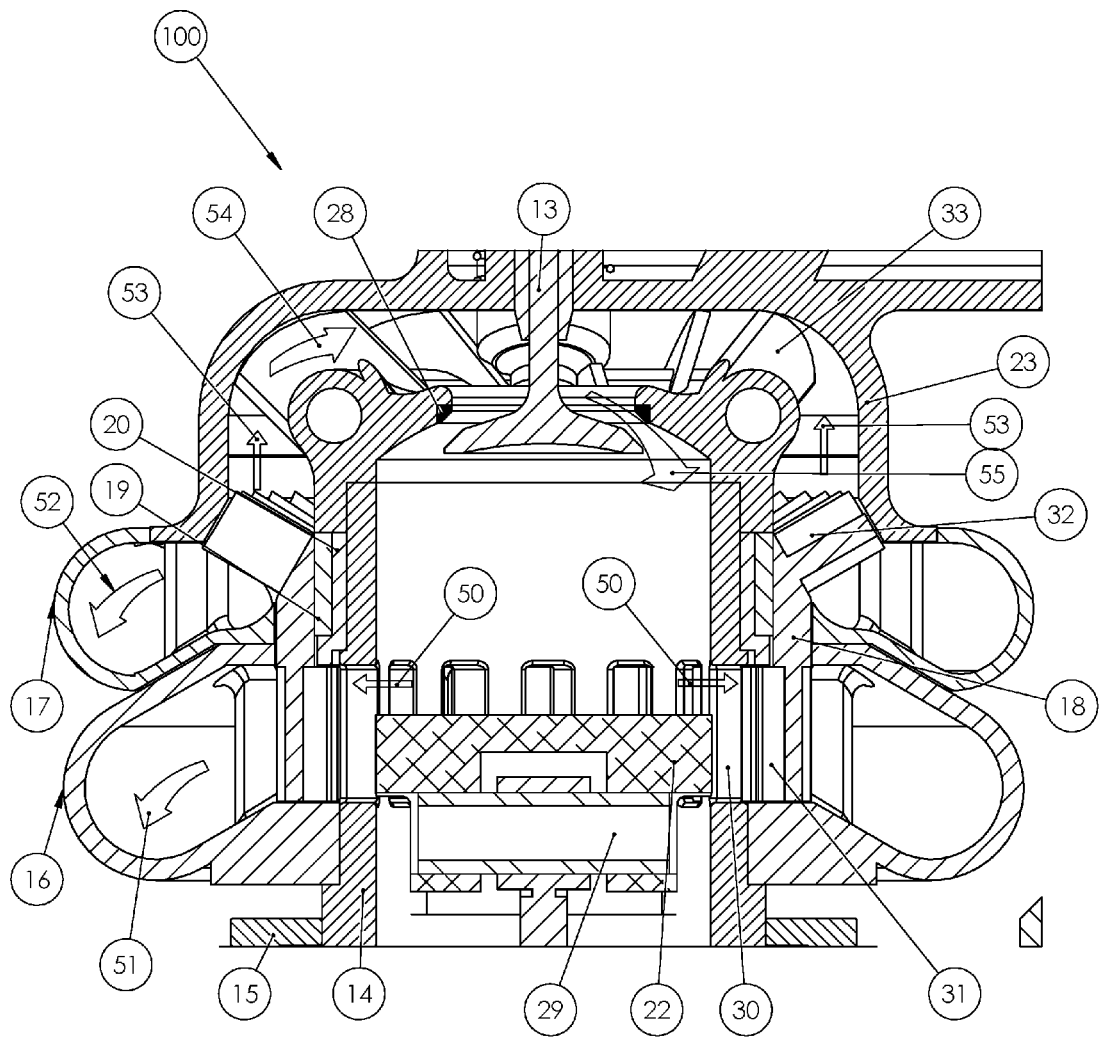
FIG. 12 is same as FIG. 10 with crankshaft orientation occurs when the crankshaft pin is 70° after bottom-dead center and the intake poppet valve is opened.

As shown in FIG. 8, FIG. 9 and FIG. 12, the intake directional vanes 33 around the intake poppet valve 13 are meant to impart a rotational velocity component to high pressure intake charge 55, whose rotational axis is in-line with the cylinder sleeve 14 centerline. Induced swirl 54 is provided in a direction of the high pressure intake charge 55 as it enters the combustion chamber is to optimize the savaging and combustion efficiencies.

Figure 10:
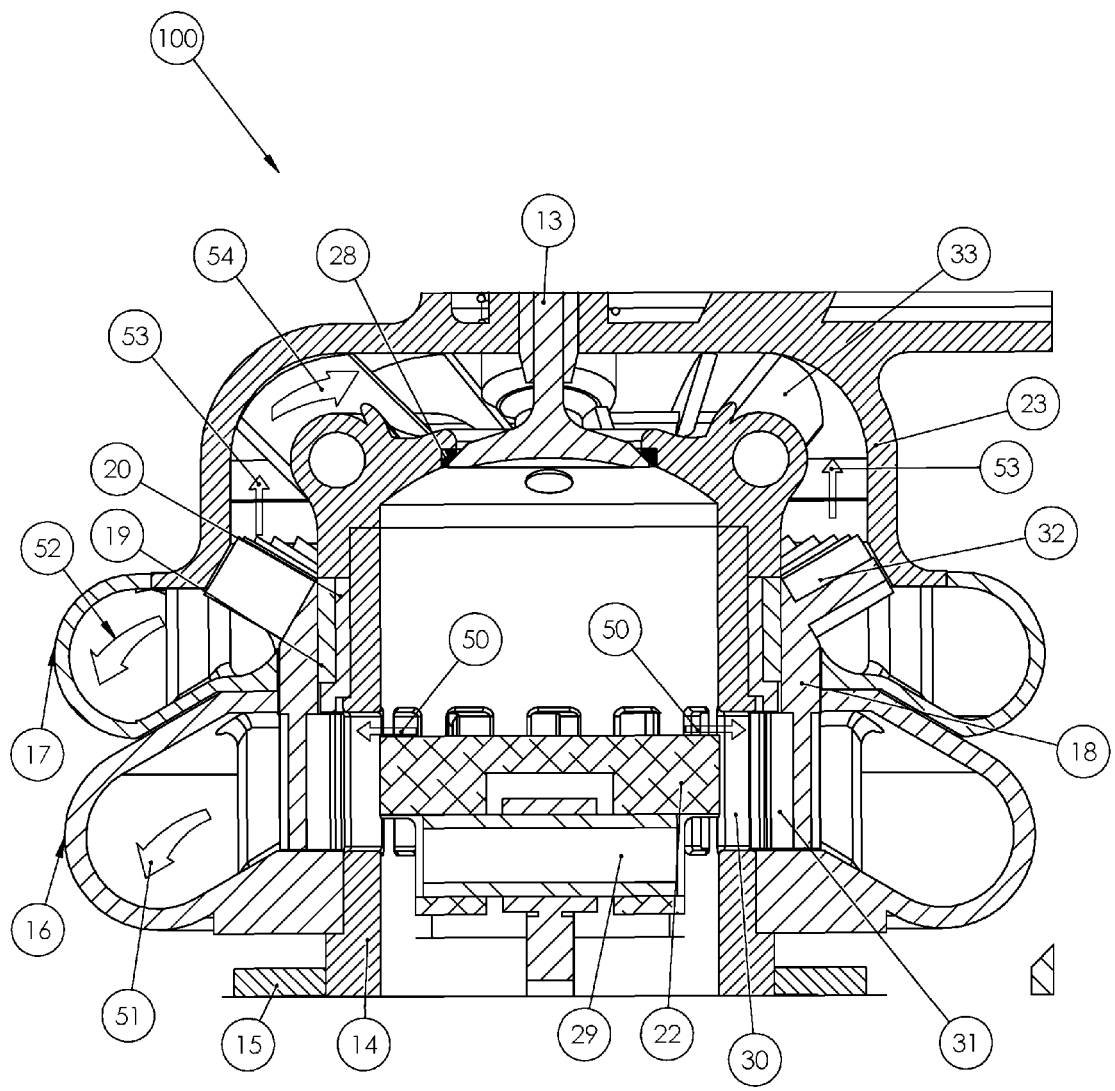
FIG. 10 is a fragmented view of FIG. 2 of the top-end of the engine. It is showing the piston and poppet valve positions relative to crankshaft rotation, this particular orientation occurs when the crankshaft orientation is 100° after top-dead center soon after the exhaust ports open.
Figure 11:
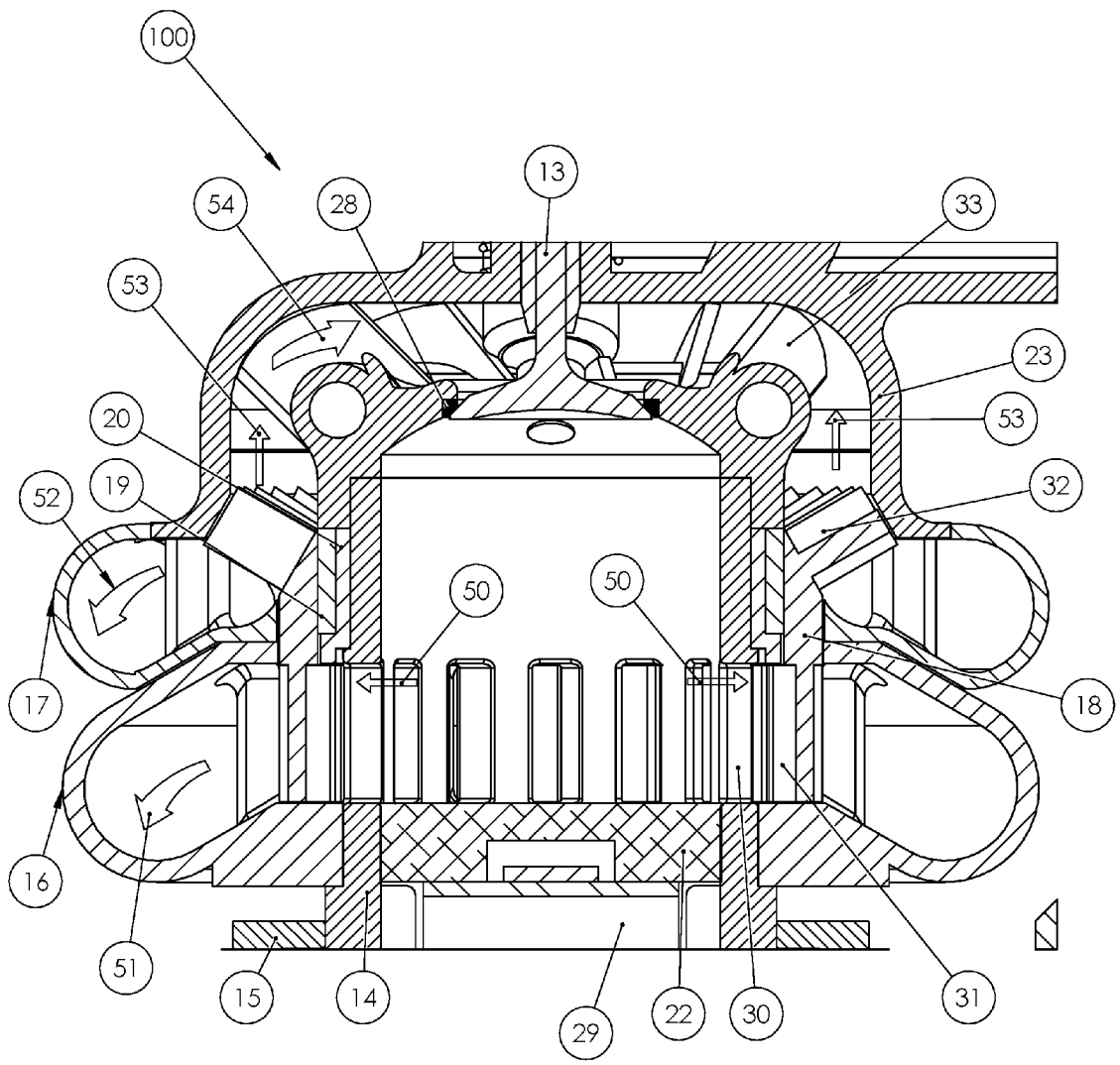
FIG. 11 is same as FIG. 10 with crankshaft orientation occurs when the piston is at bottom-dead center.

As shown in FIG. 9 and FIG. 10, the exhaust flow 51 direction is created from the high pressure exhaust 50 flowing through the exhaust port 30. The turbocharger wheel 18 has both the exhaust turbine blade 31 and the compressor blade 32 integrally connected. Therefore direction of the intake flow path 52 is shown. The compressor blade 32 pumps the air in the direction of the intake high pressure charge 53.

This invention uses a turbocharger with minimal increase in engine volume. It will provide a compact design with higher power density through forced induction.

Figure 13:
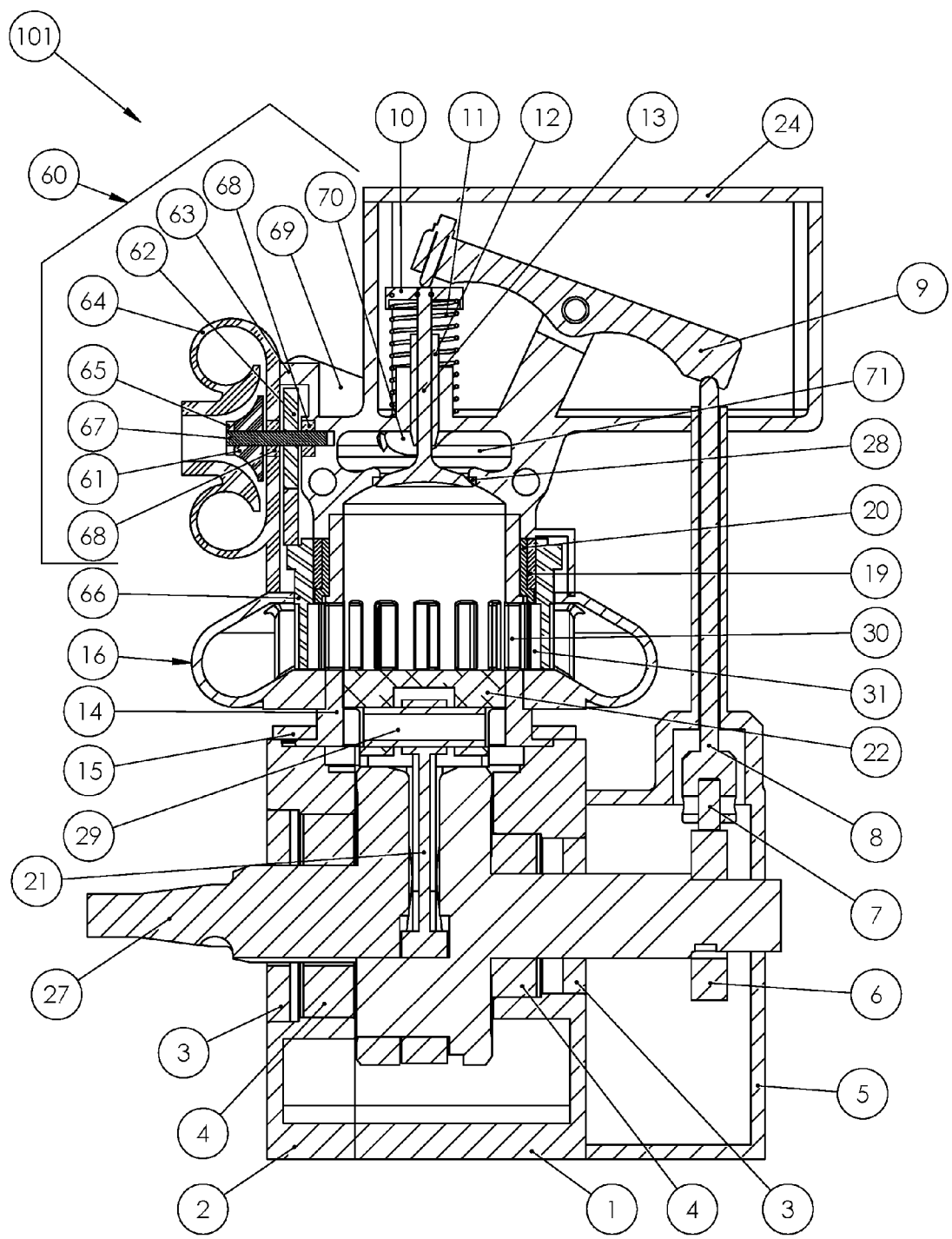
FIG. 13 is an alternate construction of FIG. 2 that uses a centrifugal compressor for the forced induction.

FIG. 13 is an alternate construction assembly 101 which connects the turbine 66 to a centrifugal compressor assembly 60 by mechanical connection in this illustration. Gear set 62 is used to make the mechanical connection which is housed in the gear housing 63. Gear set 62 is connected to compressor shaft 67 which is mounted between bearings 68. The compressor wheel 61 is retained to the compressor shaft 67 with compressor wheel nut 65. The compressor wheel 61 and related components are mounted in compressor housing 64. The compressor assembly 60 is connected the intake 69 which delivers the intake charge 70 to the intake manifold 71.

Figure 14:
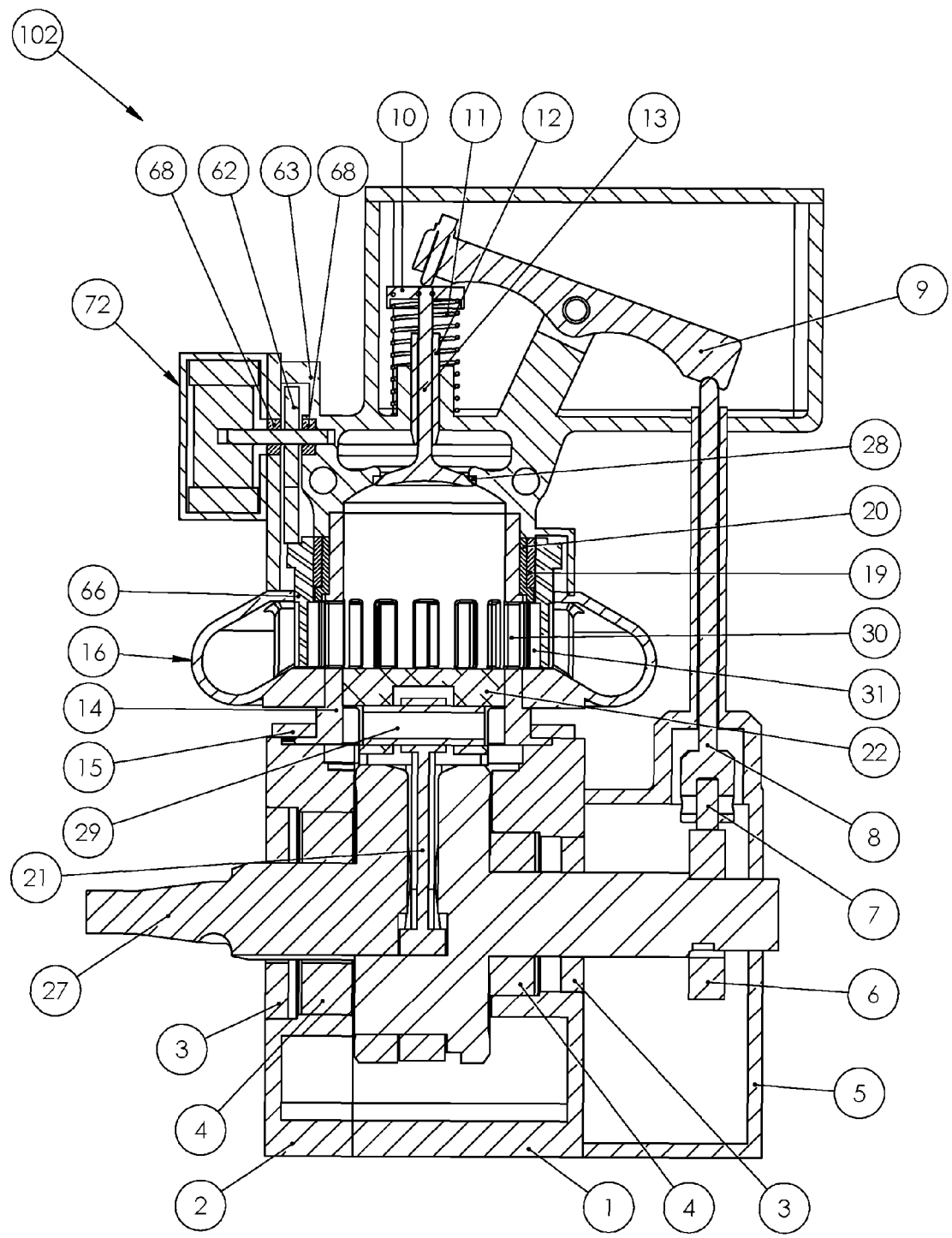
FIG. 14 is an alternate construction of FIG. 13 that includes an alternator to capture the rotating energy from the turbine.

FIG. 14 is an alternate construction assembly 102 which uses an alternator 72 to convert the mechanical energy of turbine 66 to electrical energy.

The invention described herein is by way of example and it is understood that many modifications, derivations and improvements will be apparent to those skilled in the art. Accordingly, the modifications, derivations and improvements are to be afforded within the scope of the claims appended hereto.

We claim:

1. A turbo-piston engine, including:
   an engine housing having a cylinder within said engine housing having an intake in a first end of said cylinder, at least one exhaust port in a second end of said cylinder, said engine housing further having an intake manifold and at least one intake channel therein communicating with said intake;
   an intake valve operably connected to said first end of said cylinder to open during intake of to receive air from said at least one intake channel and fuel and close post intake;
   a piston operably reciprocally disposed in said cylinder having a piston head and piston shaft, said piston head moving between a compression and an ignition positions to prevent air and fuel from exiting through said at least one exhaust port wherein air and fuel are trapped within said cylinder and an exhaust position to permit spent emissions to exit said at least one exhaust port;
   a drive shaft operably connected to said piston shaft;
   a turbine wheel operably concentrically rotatably disposed around said cylinder to receive exhaust from said at least one exhaust port; and
   a compressor wheel connected to said turbine wheel and rotatably disposed around said cylinder and in at least part of said at least one intake channel to be rotated by rotation of said turbine wheel and causing intake of air through said at least one intake channel within said intake manifold of said engine housing, said intake of air being compressed through said at least one intake channel within said intake manifold of said engine housing into said intake.

2. The turbo-piston engine of claim 1, wherein said at least one exhaust port includes a plurality of at least one exhaust ports.

3. The turbo-piston engine of claim 1, said turbine wheel includes a first plurality of blades to receive spent exhaust via said at least one exhaust port and said compressor wheel includes a second plurality of blades axially disposed from said first plurality to draw fresh air into said intake.

4. The turbo-piston engine of claim 3, said engine housing includes said first plurality of blades disposed in an exhaust manifold immediately following said at least one exhaust port and said second plurality of blades disposed inside an intake manifold portion.

5. The turbo-piston engine of claim 4, wherein said at least one exhaust ports is configured at an angle to said first plurality of blades to optimally direct flow there against and maximize compression.

6. The turbo-piston engine of claim 4, further including a small plenum above said intake valve and an outlet of said intake manifold portion communicates with said small plenum which has a volume at least that of a trapped volume formed between said piston head and said intake valve within cylinder assembly in said compression position.

7. The turbo-piston engine of claim 1, wherein said at least one intake channel includes an arcuate channel in said engine housing forms a path which air is forced through by said compressor wheel to deliver to said intake.

8. The turbo-piston engine of claim 1, wherein said intake port features air-flow guide vanes tangent to a cylinder circumference to create a strong swirling effect as an intake charge enters a combustion chamber within said cylinder.

* * * * *